US011942122B1

(12) United States Patent
Calfee et al.

(10) Patent No.: US 11,942,122 B1
(45) Date of Patent: Mar. 26, 2024

(54) DETERMINING ABSOLUTE POSITION ON HDD SPIRAL PATTERNS USING DUAL TDMR READERS

(71) Applicants: Kabushiki Kaisha Toshiba, Tokyo (JP); Toshiba Electronic Devices & Storage Corporation, Tokyo (JP)

(72) Inventors: Gary W. Calfee, Santa Clara, CA (US); Gabor Szita, Mountain View, CA (US); Jiangang Liang, Saratoga, CA (US)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/155,633

(22) Filed: Jan. 17, 2023

(51) Int. Cl.
  *G11B 5/596* (2006.01)
  *G01D 5/248* (2006.01)
  *G11B 5/56* (2006.01)

(52) U.S. Cl.
  CPC ......... *G11B 5/59666* (2013.01); *G01D 5/248* (2013.01); *G11B 5/59661* (2013.01); *G11B 5/56* (2013.01)

(58) Field of Classification Search
  None
  See application file for complete search history.

(56) References Cited

U.S. PATENT DOCUMENTS

| | | | | |
|---|---|---|---|---|
| 5,668,679 | A * | 9/1997 | Swearingen | G11B 5/59661 360/75 |
| 6,967,799 | B1 * | 11/2005 | Lee | G11B 5/59633 360/39 |
| 7,193,797 | B1 * | 3/2007 | Sun | G11B 27/36 |
| 7,876,523 | B1 * | 1/2011 | Panyavoravaj | G11B 5/59627 360/75 |
| 9,123,369 | B2 | 9/2015 | Oberg | |
| 9,286,926 | B1 | 3/2016 | Dhanda | |
| 10,068,589 | B1 | 9/2018 | Katchmart | |
| 10,529,365 | B2 | 1/2020 | Tagami | |
| 10,872,630 | B2 | 12/2020 | Maeto | |
| 11,127,427 | B1 * | 9/2021 | Yamashita | G11B 5/59688 |
| 11,776,570 | B2 * | 10/2023 | Szita | G11B 5/59666 360/77.06 |
| 2002/0067567 | A1 * | 6/2002 | Szita | G11B 5/59633 360/77.04 |
| 2007/0206319 | A1 * | 9/2007 | Rutherford | G11B 5/59666 360/75 |
| 2009/0168218 | A1 * | 7/2009 | Mizukoshi | G11B 5/59633 |
| 2018/0261244 | A1 * | 9/2018 | Gerasimov | G11B 5/59638 |
| 2022/0076703 | A1 * | 3/2022 | Katchmart | G11B 21/083 |
| 2023/0267957 | A1 * | 8/2023 | Szita | G11B 5/59661 360/77.06 |

\* cited by examiner

*Primary Examiner* — Peter Vincent Agustin
(74) *Attorney, Agent, or Firm* — Kim & Stewart LLP

(57) ABSTRACT

A method of determining radial position of a magnetic head that includes a first read sensor and a second read sensor includes: with the first read sensor, detecting a servo spiral formed on a disk; with the second read sensor, detecting the servo spiral; measuring a time interval between when the servo spiral is detected by the first read sensor and when the servo spiral is detected by the second read sensor; and based on the time interval, determining a radial position of the magnetic head relative to the disk.

20 Claims, 11 Drawing Sheets

DETERMINING ABSOLUTE POSITION ON HDD SPIRAL PATTERNS USING DUAL TDMR READERS

BACKGROUND

In a typical hard disk drive (HDD), servo sectors on the disk are used to provide position information about the location of a magnetic head over a disk surface. A common approach for writing such servo information on one or more disk surfaces in an HDD is referred to as spiral-based self-servo writing, or spiral-based SSW. According to this approach, multiple spiral-shaped servo information patterns (or "servo spirals") are written on at least one disk surface prior to the SSW process. During the SSW process, a magnetic head of the HDD is positioned relative to a disk surface based on timing and position information in the servo spirals, so that the final servo information (the servo sectors) can be written on the disk surface by the magnetic head.

For an error-free and robust SSW process, the servo spirals used should be precisely written on the disk surface with a predetermined and constant slope. Such servo spirals may be written on the disk surface with an external media writer before assembly of the disk drive, or with a servo writing machine that uses an external precision actuator to position the disk drive actuator with a mechanical push pin through an opening in the disk drive housing. In either case, setup and use of such external equipment for each individual HDD is time-consuming and expensive in the context of high-volume manufacturing.

In light of this, in-drive spiral-writing schemes have been employed, in which an HDD itself writes servo spirals prior to performing the SSW process. For example, a set of coarsely positioned spirals may be written by the HDD while the actuator is moved across a disk surface by applying a suitable open-loop voltage profile, or by using velocity control that is based on back electromotive force (back-EMF) feedback. More precisely positioned sets of spirals can then be written in one or more subsequent closed-loop spiral-writing processes, by demodulating signals from the more coarsely positioned sets of spirals. For example, a set of coarse servos spirals, a set of fine servo spirals, and a set of final servos spirals may be progressively written by the HDD itself in this way. The servo sectors are then written on a disk surface by positioning the magnetic head based on the final, most accurately positioned, set of servo spirals in a spiral-based SSW process.

In-drive methods for writing an initial set of coarsely positioned spirals can have significant velocity variation while individual spirals are written. As a result, differences in spiral-to-spiral spacing are common, particularly in the initial set of spirals written in an HDD. In fact, neighboring spirals written by in-drive spiral writing methods can be located so closely to each other that, during subsequent demodulation of the servo spirals, the servo interrupt service routine for demodulating the spirals may not have sufficient time, after processing data for the first spiral, to process data for the second spiral, thereby skipping the timing and position information provided by the second spiral. In addition, neighboring spirals may cross, so that during demodulation a subsequent spiral may be read before an antecedent spiral. In either case, such loss or scrambling of servo information can result in loss of synchronization between firmware spiral numbers and spiral data tables storing data for each of the spirals written on the disk surface. Such issues during servo spiral demodulation can require rework or scrapping of an HDD.

In light of the above, there is a need in the art for improving the reliability of the spiral-based SSW process.

SUMMARY

One or more embodiments provide systems and methods for determining an absolute radial (cross-track) position of a magnetic head of an HDD that includes a first read sensor and a second read sensor, such as a magnetic head configured to perform two-dimensional magnetic recording (TDMR). According to the embodiments, the absolute radial position of the magnetic head relative to the disk surface is determined based on a time interval between when the first read sensor detects a specific spiral and the second read sensor detects the specific spiral. In some embodiments, the time interval is caused by a circumferential (down-track) spacing between the first read sensor and the second read sensor of the magnetic head relative to the disk surface. In some embodiments, a plurality of pre-computed radial positions are included in a lookup table, and the absolute radial position of the magnetic head is based on a pre-computed radial position in the plurality of pre-computed radial positions that corresponds to the time interval. In some embodiments, the first read sensor and the second read sensor detect the specific spiral when crossing a leading edge of the servo spiral; in some embodiments, the first read sensor and the second read sensor detect the specific spiral when crossing a center line of the servo spiral; and in some embodiments, the first read sensor and the second read sensor detect the specific spiral when crossing a specific sync mark included in the servo spiral.

According to an embodiment, a method of determining radial position of a magnetic head that includes a first read sensor and a second read sensor includes: with the first read sensor, detecting a servo spiral formed on a disk; with the second read sensor, detecting the servo spiral; measuring a time interval between when the servo spiral is detected by the first read sensor and when the servo spiral is detected by the second read sensor; and based on the time interval, determining a radial position of the magnetic head relative to the disk.

A disk drive, according to an embodiment, includes: a magnetic head having first and second read sensors; a disk medium with a first surface on which at least one servo spiral is formed; and a controller. In the embodiment, the controller is configured to perform the steps of: with the first read sensor, detecting a servo spiral formed on a disk; with the second read sensor, detecting the servo spiral; measuring a time interval between when the servo spiral is detected by the first read sensor and when the servo spiral is detected by the second read sensor; and based on the time interval, determining a radial position of the magnetic head relative to the disk.

BRIEF DESCRIPTION OF THE DRAWINGS

So that the manner in which the above recited features of embodiments can be understood in detail, a more particular description of embodiments, briefly summarized above, may be had by reference to the appended drawings. It is to be noted, however, that the appended drawings illustrate only typical embodiments and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

System Overview

Figure 1:
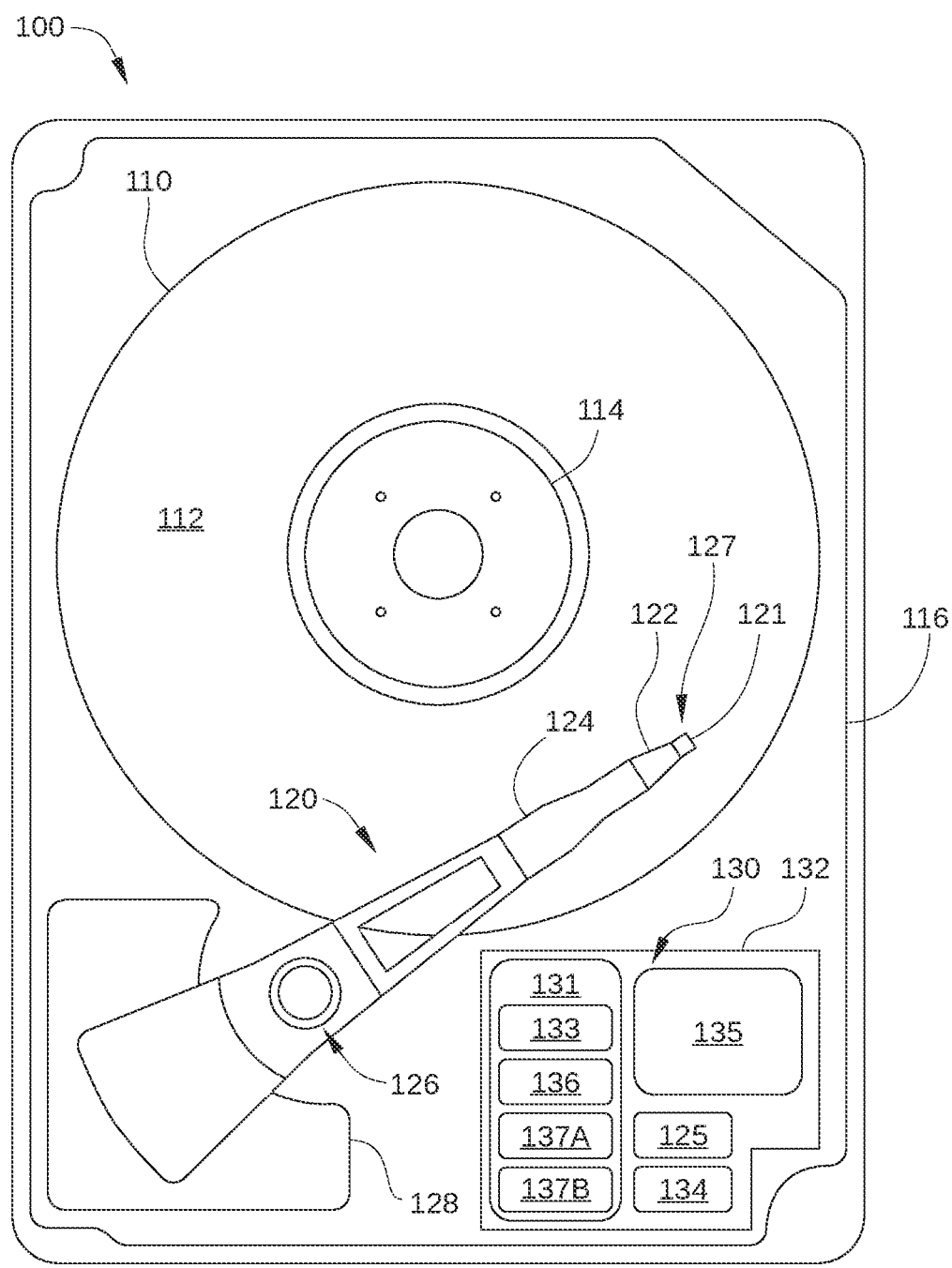
FIG. 1 is a schematic view of an exemplary hard disk drive, according to one embodiment.

FIG. 1 is a schematic view of an exemplary hard disk drive (HDD) 100, according to one embodiment. For clarity, HDD 100 is illustrated without a top cover. HDD 100 includes multiple storage disks 110 (only one of which is visible in FIG. 1) that each include one or two recording surfaces 112 on which a plurality of concentric data storage tracks are disposed. Storage disks 110 are coupled to and rotated by a spindle motor 114 that is mounted on a base plate 116. An actuator arm assembly 120 is also mounted on base plate 116, and includes one or more sliders 121 (only one of which is visible in FIG. 1), each mounted on a flexure arm 122 with a magnetic read/write head 127 that reads data from and writes data to the data storage tracks of an associated recording surface 112. Each flexure arm 122 is attached to an actuator arm 124 that rotates about a bearing assembly 126 by a voice coil motor 128. Thus, voice coil motor 128 moves all of the one or more sliders 121 radially relative to a respective recording surface 112 of a respective storage disk 110, thereby positioning a read/write head 127 over a desired concentric data storage track. Read/write head 127 is a magnetic head that includes multiple read heads, such as a magnetic head configured to perform two-dimensional magnetic recording (TDMR). One embodiment of read/write head 127 is described below in conjunction with FIG. 2.

Figure 2:
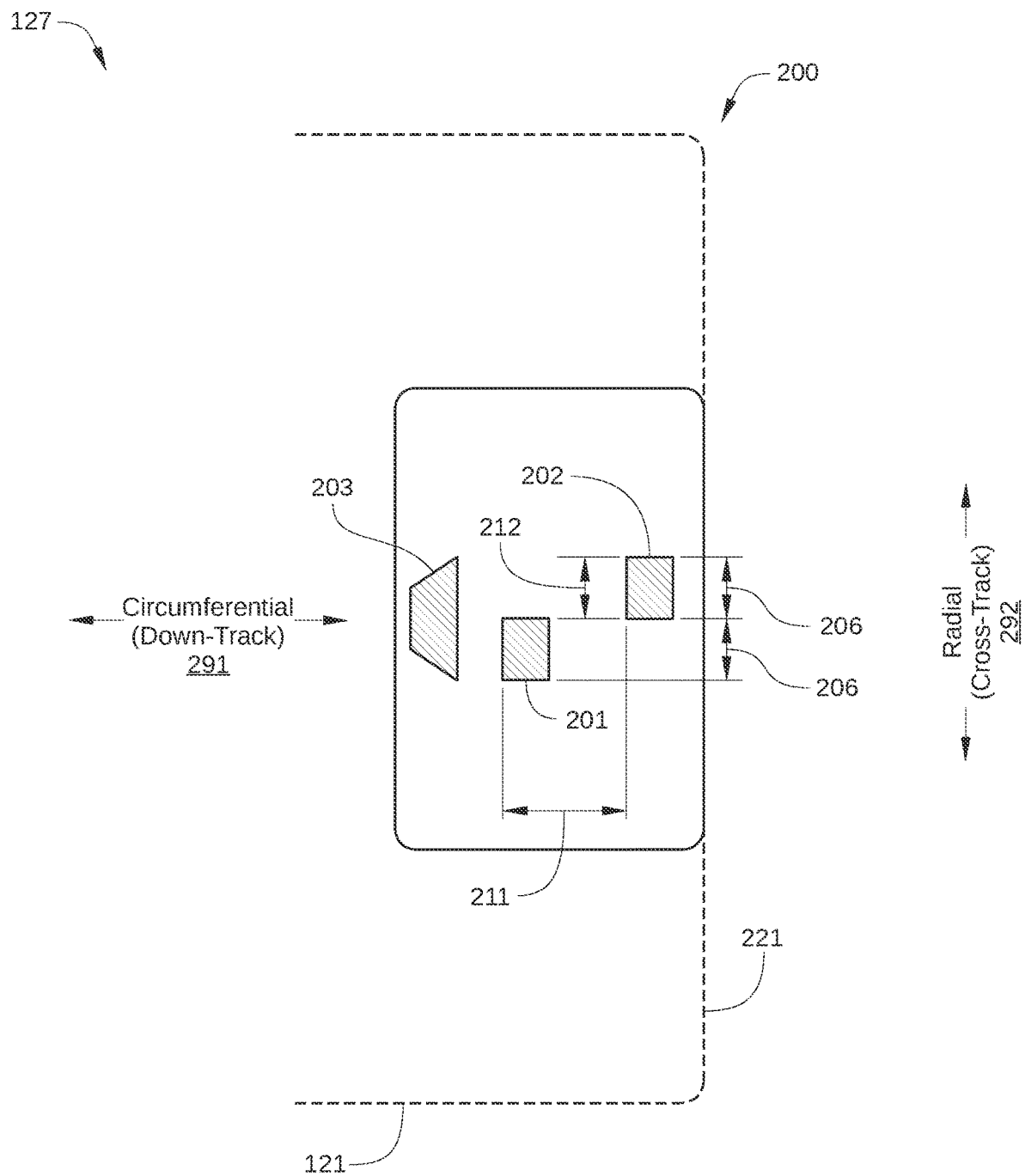
FIG. 2 schematically illustrates an end of a read/write head, according to various embodiments.

FIG. 2 schematically illustrates an end 200 of read/write head 127, according to various embodiments. End 200 faces toward a surface of an associated recording surface 112 (not shown) of a disk. Thus, in FIG. 2, end 200 is shown as viewed from such a recording surface 112. In some embodiments, end 200 of read/write head 127 is formed via a series of thin films deposited and lithographically patterned on a trailing surface 221 of slider 121, using fabrication techniques well-known in the art for forming a thin film magnetic head. As shown, in the embodiment illustrated in FIG. 2, read/write head 127 includes a first read sensor 201, a second sensor 202, and a write head 203.

For reference, a circumferential direction 291 (sometimes referred to as the "down-track" or tangential direction) and a radial direction 292 (sometimes referred to as the "cross-track" direction) are also indicated in FIG. 2. It is noted that circumferential direction 291 shown in FIG. 2 is nominally parallel with the down-track direction of a data storage track of the recording surface 112 associated with read/write head 127. In practice, circumferential direction 291 of read/write head 127 varies with skew angle relative to the down-track direction of a data storage track. Therefore, as voice coil motor 128 (shown in FIG. 1) positions read/write head 127 at different radial locations relative to associated recording surface 112, the orientation of read/write head 127 changes relative to recording surface 112. As a result, circumferential direction 291 is typically not exactly parallel with the down-track direction of a data storage track of the recording surface 112. Similarly, radial direction 292 is shown in FIG. 2 to be nominally parallel with the cross-track direction of a data storage track of recording surface 112, whereas in practice, radial direction 292 varies with skew angle relative to the cross-track direction of a data storage track and is typically not exactly parallel with the cross-track direction of a data storage track of recording surface 112.

First read sensor 201 and second read sensor 202 are both read sensors that are each configured to generate an output signal when read/write head 126 crosses data or servo information written to recording surface 112. In some embodiments, first read sensor 201 and second read sensor 202 are each disposed between two magnetic shields (not shown) that are formed of magnetically permeable material. In some embodiments, the magnetic shields for first read sensor 201 and second read sensor 202 are electrically conductive and function as electrical leads to first read sensor 201 and second read sensor 202. The magnetic shields are configured to prevent or reduce the likelihood of first read sensor 201 and second read sensor 202 erroneously reading recorded data proximate the current data track being read. In some embodiments, a width 206 of first read sensor 201 and/or second read sensor 202 is based on the track pitch of recording surface 111 (i.e., the distance from a data track center of one track of recording surface 112 to the data track center of an adjacent track of recording surface 112). In some embodiments, each of first read sensor 201 and second read sensor 202 has an equal width 206 in radial direction 292. Alternatively or additionally, in some embodiments, each of first read sensor 201 and second read sensor 202 has a different width in radial direction 292. In some embodiments, each of first read sensor 201 and second read sensor 202 has an equal width (not shown) in circumferential direction 291. Alternatively or additionally, in some embodiments, each of first read sensor 201 and second read sensor 202 has a different width in circumferential direction 291.

In the embodiment illustrated in FIG. 2, first read sensor 201 and second read sensor 202 are each disposed at a different location on end 200 of read/write head 127. Thus, first read sensor 201 and second read sensor 202 are offset from each other in at least one of circumferential direction 291 or radial direction 292. In FIG. 2, first read sensor 201 and second read sensor 202 are offset from each other in circumferential direction 291 by a circumferential offset 211 and in radial direction 292 by a radial offset 212. Alternatively, in other embodiments, first read sensor 201 and second read sensor 202 can be aligned with each other in one of circumferential direction 291 or radial direction 292.

In the embodiment illustrated in FIG. 2, read/write head 127 has two read heads. In other embodiments, read/write head 127 can have any technically feasible number N of read heads. In such embodiments, the N read heads of read/write head 127 may be aligned with each other in radial direction 292 or circumferential direction 291 and/or offset from each other in radial direction 292 or circumferential direction 291. Further, in such embodiments, each of the N read heads may be similar in size and/or composition, or may have different sizes and/or compositions.

Write head 203 is configured to write information to a surface of the disk 110 that corresponds to read/write head 127. In some embodiments, write head 203 includes a perpendicular magnetic write pole (WP). Further, in some embodiments, write head 203 includes trailing and/or side shields (not shown).

Returning to FIG. 1, spindle motor 114, read/write head 127, and voice coil motor 128 are coupled to electronic circuits 130, which are mounted on a printed circuit board 132. In some embodiments, each read/write head 127 has an associated additional actuator. The additional actuator (not shown in FIG. 1) could be on the suspension (i.e., flexure arm 122), at the gimbal between the suspension and slider 121, or on slider 121, and can move the associated read/write head 127 radially a small distance. Such actuators are generally referred to as dual-stage actuators, and enable the servo system of HDD 100 to attain more accurate tracking control.

In the embodiment illustrated in FIG. 1, a single actuator arm assembly 120 is shown that includes only one slider 121, one flexure arm 122, one actuator arm 124, and one read/write head 127. In other embodiments, actuator arm assembly 120 includes a plurality of actuator arms 124, sliders 121, flexure arms 122, and read/write heads 127, where each read/write head 127 is associated with a different recording surface 112 of HDD 100. Further, in some embodiments, HDD 100 can include multiple actuator arm assemblies 120 that are each rotated about bearing assembly 126 by a respective VCM 128 independently from each other. In such embodiments, each actuator arm assembly 120 may each include a plurality of actuator arms 123, sliders 121, flexure arms 122, and read/write heads 127.

Electronic circuits 130 include read/write channel 137A a read channel 137B, a microprocessor-based controller 133, random-access memory (RAM) 134 (which may be a dynamic RAM and used as one or more data buffers) and/or a flash memory device 135, and, in some embodiments, a flash manager device 136. In some embodiments, read/write channel 137A, read channel 137B, microprocessor-based controller 133, and/or flash manager device 136 are included in a single chip, such as a system-on-chip 131. In some embodiments, HDD 100 further includes a motor-driver chip 125 that accepts commands from microprocessor-based controller 133 and drives both spindle motor 114 and voice coil motor 128. Read/write channel 137A communicates with first read sensor 201 (shown in FIG. 2) of read/write head 127 via a preamplifier (not shown) that may be mounted on a flex-cable that is itself mounted on either base plate 116, actuator arm 120, or both. Similarly, read channel 137B communicates with second read sensor 202 (shown in FIG. 2) of read/write head 127 via a preamplifier (not shown) that may be mounted on the flex-cable.

When data are transferred to or from a particular storage disk 110 of HDD 100, actuator arm assembly 120 moves in an arc between the inner diameter (ID) and the outer diameter (OD) of a particular storage disk 110. Actuator arm assembly 120 accelerates in one angular direction when current is passed in one direction through the voice coil of voice coil motor 128 and accelerates in an opposite direction when such current is reversed, thereby allowing control of the position of actuator arm assembly 120 and the attached read/write head 127 with respect to the particular storage disk 110. Voice coil motor 128 is coupled with a servo system that uses the positioning data read from servo wedges on storage disk 110 by read/write head 127 to determine the position of read/write head 127 over a specific data storage track. For example, the servo system may position read/write head 127 over recording surface 112 based on positioning data read from recording surface 112.

In positioning a read/write head 127 over a recording surface 112, the servo system determines an appropriate current to drive through the voice coil of voice coil motor 128, and drives said current using a current driver and associated circuitry. Typically, the appropriate current is determined based in part on a position feedback signal of the read/write head 127, such as a position error signal (PES). The PES is typically generated by using servo patterns included in the servo wedges (not shown) on the recording surface 112 as a reference. One embodiment of a recording surface 112 is illustrated in FIG. 3.

Figure 3:
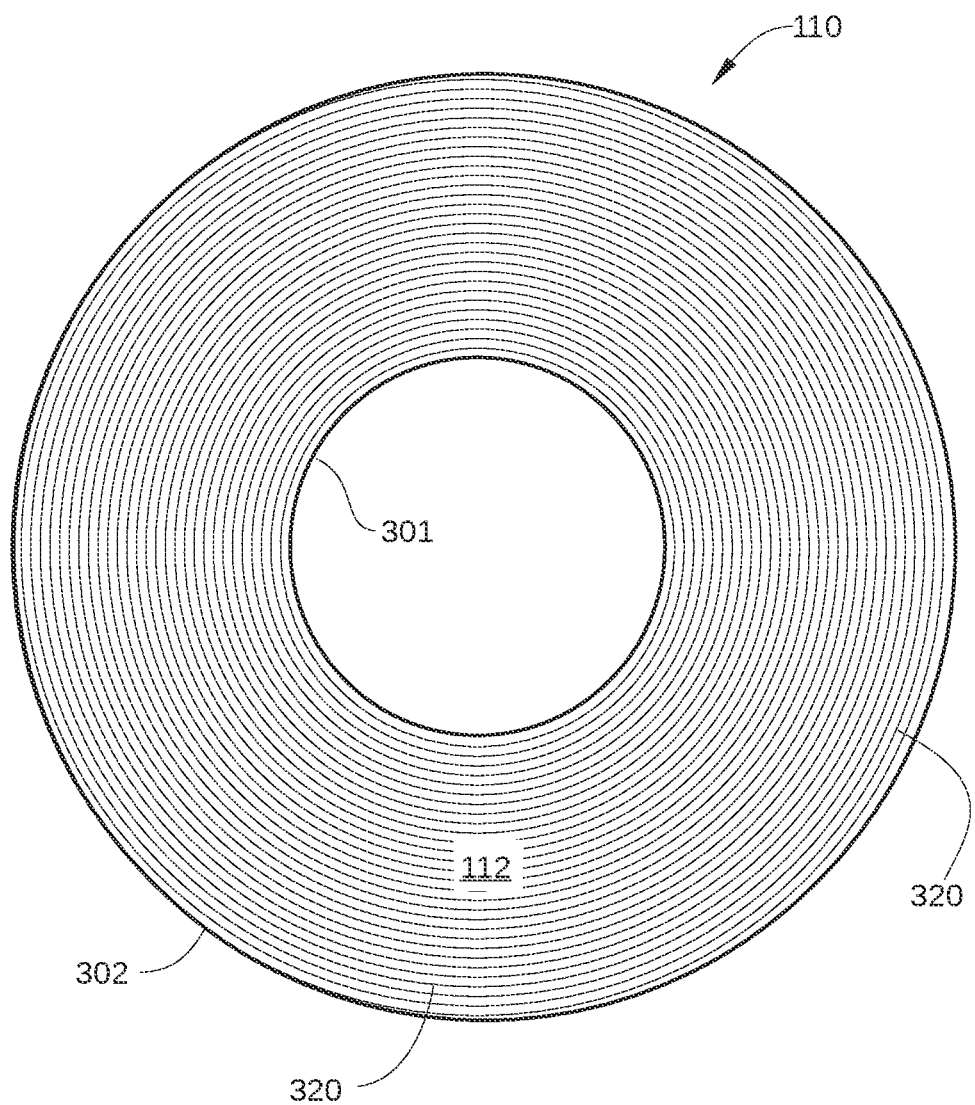
FIG. 3 schematically illustrates a recording surface of a storage disk with concentric data storage tracks formed thereon, according to an embodiment.

FIG. 3 schematically illustrates a recording surface 112 of a storage disk 110 with concentric data storage tracks 320 formed thereon, according to an embodiment. Data storage tracks 320 are formed on recording surface 112 between an ID 301 and an OD 302 of storage disk 110. Data storage tracks 320 are configured for storing data, and the radial position and track pitch, i.e., spacing, of data storage tracks 320 is defined by servo sectors (not shown) formed on recording surface 112. Each servo sector contains a reference signal that is read by read/write head 127 during read and write operations to position read/write head 127 above a desired data storage track 320. Typically, the actual number of data storage tracks 320 included on recording surface 112 is considerably larger than illustrated in FIG. 3. For example, recording surface 112 may include hundreds of thousands of concentric data storage tracks 320.

In order for HDD 100 to perform SSW and write the above-described servo wedges on storage disk 110 with the necessary precision for proper operation of HDD 100, position and timing information are provided to the disk drive servo system of HDD 100. The position and timing information that enable the internal servo system of HDD 100 to perform servo self-write (SSW) is typically in the form of reference spiral tracks or "servo spirals" written on storage disk 110. One embodiment of such servo spirals is illustrated in FIG. 4.

Figure 4:
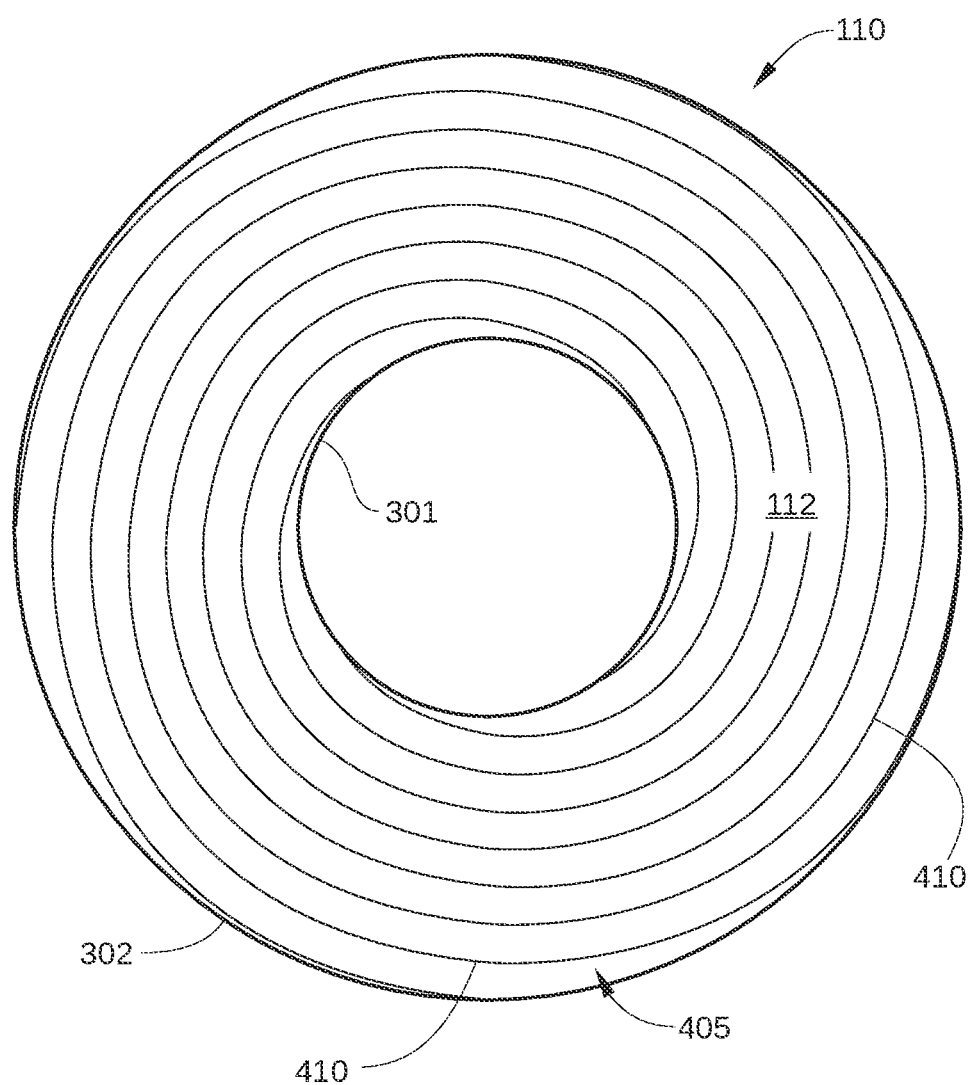
FIG. 4 illustrates a storage disk prior to undergoing an SSW process, according to one embodiment.

FIG. 4 illustrates storage disk 110 prior to undergoing an SSW process, according to one embodiment. As shown, storage disk 110 has a spiral set 405 written thereon that includes a plurality of reference spirals 410 that are each circumferentially spaced from adjacent reference spirals 410. It is noted that the number of reference spirals 410 in spiral set 405 is generally larger than that shown in FIG. 4, for example as few as ten or twenty, or as many as several hundred.

Spiral set 405 may be any set of reference spirals configured to provide timing and position information for the servo system of HDD 100, for example to position a write head while writing another set of reference spirals or servo sectors for data storage tracks 320 (shown in FIG. 3). Thus, in some embodiments, spiral set 405 is a set of coarse, i.e., initial, reference spirals. In such embodiments, spiral set 405 may be written onto a substantially blank surface 112 of storage disk 110 without the aid of external equipment using read/write head 127 and the servo system of HDD 100, for example, via a bootstrap spiral-writing process. In such a process, references spirals 410 of spiral set 405 are written by read/write head 127 while actuator arm assembly 120 is moved across surface 112 either by applying a suitable open loop voltage or current profile, or by using velocity control based on back EMF feedback. Alternatively, in some embodiments spiral set 405 is a set of fine reference spirals, i.e., reference spirals that are more accurately positioned than coarse reference spirals. In such embodiments, spiral set 405 is written onto surface 112 after surface 112 has another set of the above-described coarse spirals written thereon (not shown for clarity). In such embodiments, reference spirals 410 are typically written onto surface 112 using closed-loop tracking of the previously written coarse reference spirals, and can be used subsequently for writing a more accurately positioned set of servo spirals, such as final reference spirals, that enable the writing of servo sector information on surface 112 by HDD 100 in an SSW process. Thus, reference spirals 410 enable the generation of a set of more accurately positioned reference spirals or the writing of final servo sector information on surface 112 using closed-loop control in the servo system of HDD 100.

Figure 5:
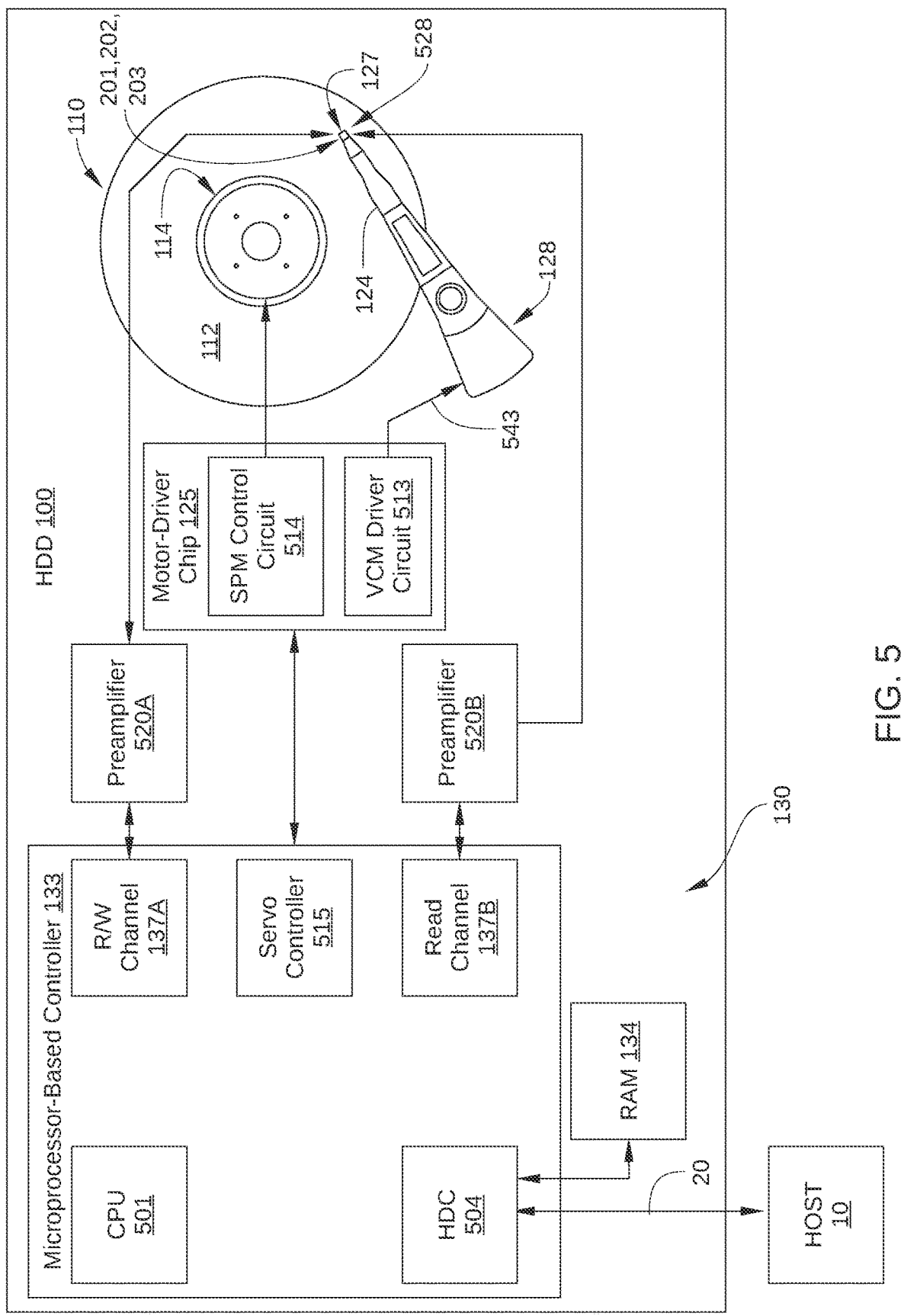
FIG. 5 illustrates an operational diagram of an exemplary hard disk drive configured to implement various embodiments.

FIG. 5 illustrates an operational diagram of HDD 100 configured to implement various embodiments. In the embodiment illustrated in FIG. 5, a specific configuration of certain elements of electronic circuits 130 is described. In other embodiments, any other suitable arrangement or configuration of electronic circuits 130 may be employed that is operable to implement one or more embodiments described herein. For example, in some embodiments, various elements of microprocessor-based controller 133 may be configured in a single SoC and/or implemented as stand-alone chips included in electronic circuits 130.

HDD 100 is connected to a host 10, such as a host computer, via a host interface 20, such as a serial advanced technology attachment (SATA) bus or a Serial Attached Small Computer System Interface (SAS) bus. As shown, electronic circuits 130 of HDD 100 include microprocessor-based controller 133 and motor driver chip 125 communicatively coupled to microprocessor-based controller 133.

In the embodiment illustrated in FIG. 5, microprocessor-based controller 133 includes one or more central processing units (CPUs) 501 or other processors, a servo controller 515, a hard disk controller (HDC) 504, a read/write channel 137A, and a read channel 137B.

Motor-driver chip 125 includes a VCM driver circuit 513 and a spindle motor (SPM) control circuit 514. VCM driver circuit 513 generates an amplified control signal 543 in response to control signals (such as VCM commands) from servo controller 515. Control signals 543 enable execution of disk access commands received from host 10 that are to be executed by a servo system of HDD 100 that includes VCM 128.

In the embodiment illustrated in FIG. 5, HDD 100 includes a single RAM 134 that is external to microprocessor-based controller 133. In other embodiments, HDD 100 may include any other suitable configuration of RAM 134, such as a DRAM device integrated in microprocessor-based controller 133.

HDD 100 further includes a preamplifier 520A associated with read sensor 201 and write head 203 and a preamplifier 520B associated with read sensor 202. Preamplifiers 520A and 520B can be each mounted on actuator arm assembly 120 or elsewhere within the head and disk assembly (HDA) of HDD 100. Preamplifier 520A amplifies a read signal output from read sensor 201 and transmits the amplified read signal to read/write channel 137A. In addition, preamplifier 520A supplies a write signal (e.g., current) to write head 203 in response to write data input from read/write channel 137A. Preamplifier 520B amplifies a read signal output from read sensor 202 and transmits the amplified read signal to read channel 137B.

CPU 501 controls HDD 100, for example according to firmware stored in flash memory device 135 or another nonvolatile memory, such as portions of recording surfaces 112. For example, CPU 501 manages various processes performed by HDC 504, read/write channel 137A, read channel 137B, read sensor 201, read sensor 202, write head 203, recording surfaces 112, and/or motor-driver chip 125. Such processes include a writing process for writing data onto recording surfaces 112, a reading process for reading data from recording surfaces 112, various calibration processes, a self-servo-writing process, and the like.

In some embodiments, a servo system of HDD 100 (e.g., CPU 501, read/write channel 137A, write channel 137B, preamplifier 520A, preamplifier 520B, servo controller 515, voice-coil motor 128, and a suitable microactuator 528) performs positioning of read/write head 127 included in actuator arm assembly 120 over a corresponding recording surface 112, during which CPU 501 determines an appropriate current to drive through the voice coil of VCM 128. Typically, the appropriate current is determined based in part on a position feedback signal of read/write head 127, such as PES.

Read/write channel 137A and read channel 137B are signal processing circuits that decode read signals transmitted from respective preamplifiers 520A and 520B into read data that are outputted to HDC 504. In addition, read/write channel 137A encodes write data input from HDC 504 and outputs the encoded write data to preamplifier 520A. In some embodiments, HDC 504 controls access to RAM 134 by CPU 501, read/write channel 137A, and write channel 137B, and receives/transmits data from/to host 10. In some embodiments, HDC 504 receives/transmits data from/to host 10 via interface 20.

In the embodiment illustrated in FIG. 5, various links are shown between certain elements of HDD 100 for enablement of certain embodiments. In some embodiments, additional and/or alternative links between certain elements of HDD 100 may exist for operation of HDD 100, but are not shown for clarity and ease of description. Such additional and/or alternative links would be known to one of ordinary skill in the art.

Using Single Servo Spiral to Determine Absolute Radial Position

According to various embodiments, an absolute radial position of read/write head 127 is determined via a single servo spiral formed on the recording surface 112 associated with read/write head 127. In the embodiments, the absolute radial position of the magnetic head relative to the recording surface 112 is determined based on a time interval between when first read sensor 201 detects a specific spiral and second read sensor 202 detects the specific spiral, where the time interval is caused by a circumferential offset between first read sensor 201 and second read sensor 202. This circumferential offset between first read sensor 201 and second read sensor 202 varies in a predictable manner as actuator arm 124 is rotated through its stroke by voice coil motor 128 to change the radial location of read/write head relative to recording surface 112. This is because read/write head 127 changes orientation (skew angle) relative to recording surface 112 as actuator arm 124 is rotated through its stroke. As a result, each specific circumferential offset between first read sensor 201 and second read sensor 202 corresponds to a different absolute radial position of read/write head 127 relative to recording surface 112, and therefore the time interval caused by a specific circumferential offset indicates a specific absolute radial position.

In some embodiments, a circumferential spacing between first read sensor 201 and second read sensor 202 is determined based on the relative positions of first read sensor 201 and second read sensor 202 within read/write head 127 and on the specific geometry of spindle motor 114, actuator arm 124, flexure arm 122, and bearing assembly 126. In such embodiments, based on such information, an expected offset in the circumferential direction between read sensor 201 and read sensor 202 can be computed across the entire stroke of voice coil motor 128, where each absolute radial position of read/write head 127 corresponds to a different circumferential offset between first read sensor 201 and second read sensor 202. In such embodiments, a lookup table of expected circumferential spacings or measured time intervals based on such spacings can be constructed, in which each expected circumferential spacing or measured time interval entry corresponds to a different absolute radial position entry for read/write head 127. Alternatively, based on such information, a function can be programmed into microprocessor-based controller 133 or some other controller associated with HDD 100, where the function generates a different absolute radial position value for read/write head 127 for each measured time interval. Thus, in either case, based on a measured time interval for a specific spiral crossing of read/write head 127, the absolute radial position of read/write head 127 can be determined. One embodiment of such a lookup table is described below in conjunction with FIG. 6.

Absolute Radial Position Look-Up Table

Figure 6:
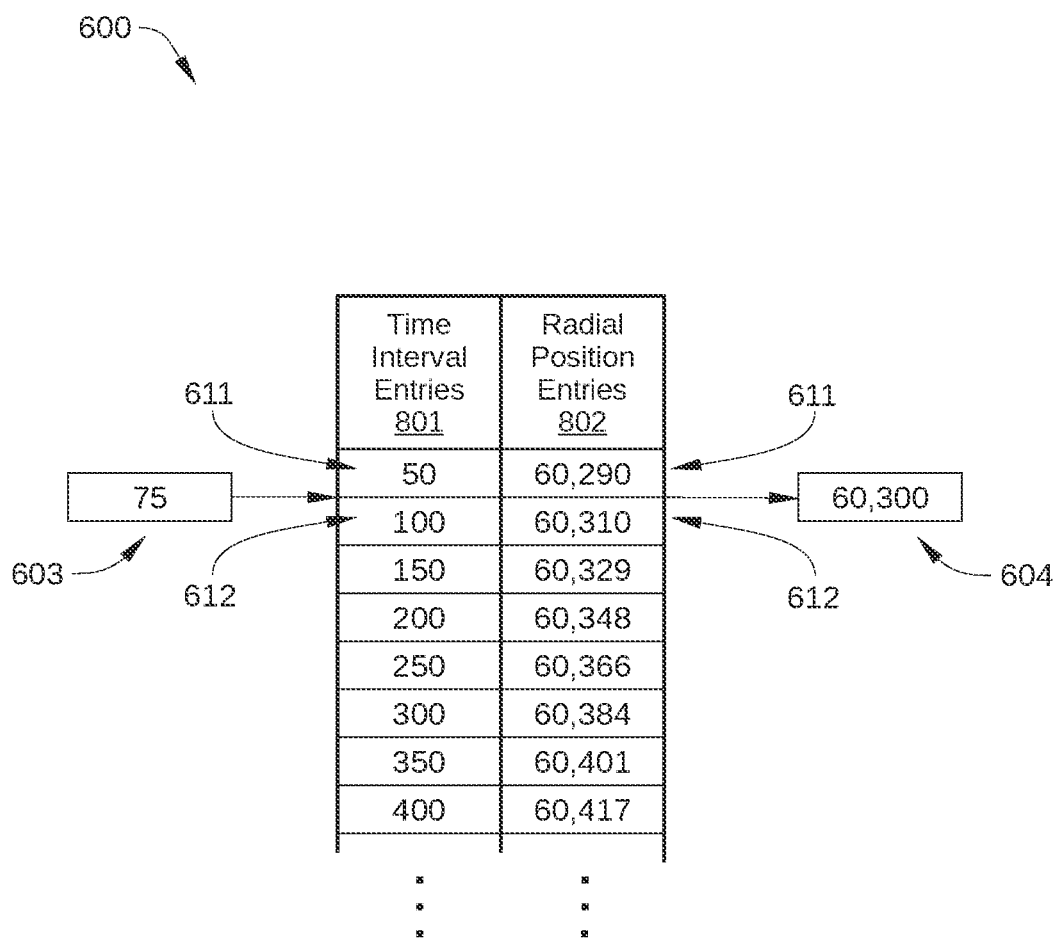
FIG. 6 schematically illustrates an absolute radial position lookup table, according to an embodiment.

FIG. 6 schematically illustrates an absolute radial position lookup table 600, according to an embodiment. As shown, absolute radial position lookup table 600 includes a plurality of time interval entries 601 that are each associated with a corresponding radial position entry 602. In some embodiments, time interval entries 601 are values in microseconds or some other measure of time, and radial position entries 602 are estimated track numbers or some other measures of absolute radial position. According to various embodiments, radial position entries 602 are pre-computed values determined prior to an SSW process. In such embodiments, the absolute radial position of a magnetic head relative to a recording surface of HDD 100 can be determined via absolute radial position lookup table 600. For example, in some embodiments, the absolute radial position of the magnetic head is determined by: measuring a time interval associated with the circumferential offset between two read sensors included in the magnetic head, determining the time interval entry 601 that most closely approximates the measured time interval, and selecting the radial position entry 602 that corresponds to that time interval entry 601.

In some embodiments, the time interval can be measured at a higher precision than the granularity of time interval entries 601 in absolute radial position lookup table 600. In such embodiments, determining the absolute radial position of the magnetic head can further include interpolation between adjacent radial position entries of absolute radial position lookup table 600 based on the measured time interval and on the two time interval entries 601 that are adjacent to the measured time interval. For example, in one instance, a measured time interval 603 has a value of 75 microseconds, which falls between a first time interval entry 611 and a second time interval entry 612. Thus, in such an embodiment, the absolute radial position of the magnetic head is determined by interpolating between a first radial position entry 621 (which corresponds to first time interval entry 611) and a second radial position entry 622 (which corresponds to second time interval entry 612). In the above example, for a measured time interval 603 that has a value of 75 microseconds, interpolation between first radial position entry 621 and second radial position entry 622 yields an absolute radial position 604 of track number 60,300.

As noted previously, in some embodiments, measured time interval 603 can be a time interval between when a first read sensor of a magnetic head (e.g., first read sensor 201 in FIG. 2) crosses a specific circumferential location on a recording surface and second read sensor of the magnetic head (e.g., second read sensor 202 in FIG. 2) crosses the specific circumferential location. In some embodiments, the circumferential location is associated with a servo spiral formed on the recording surface. For example, the circumferential location can be a leading edge of the servo spiral, a center line of the servo spiral, or a specific sync mark included in the servo spiral. Various embodiments for determining measured time interval 603 are described below in conjunction with FIGS. 7-10.

Using Servo Spiral Leading Edge Crossing to Determine Absolute Radial Position

Figure 7:
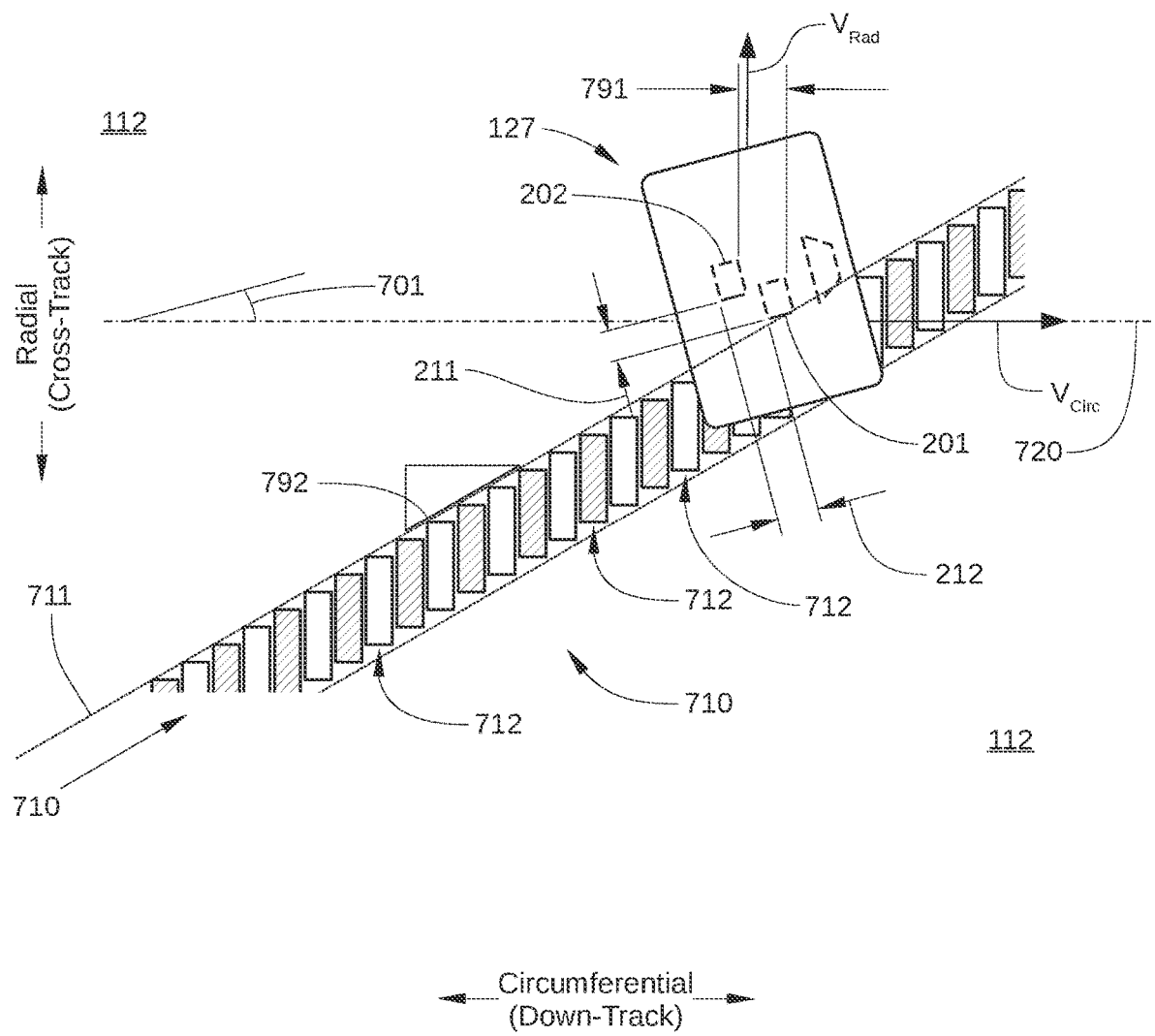
FIG. 7 schematically illustrates a time interval being measured by a read/write head based on a leading edge of a servo spiral, according to various embodiments.

FIG. 7 schematically illustrates a time interval being measured by read/write head 127 based on a leading edge 711 of a servo spiral 710, according to various embodiments. In the embodiments, an absolute radial position 720 of read/write head 127 is determined by measuring a time interval between when first read sensor 201 and second read sensor 202 cross leading edge 711. In FIG. 7, read/write head 127 is schematically illustrated moving circumferentially (down-track) relative to recording surface 112 of a magnetic disk and crossing servo spiral 710. Specifically, first read sensor 201 is shown crossing leading edge 711 of servo spiral 710 at a first point in time, where leading edge 711 is the first edge of servo spiral 710 encountered by read/write head 127 when crossing servo spiral 710. As first read sensor 201 crosses leading edge 711, first read sensor 201 is proximate the magnetic transitions 712 that are included in servo spiral 710 and therefore generates a read signal based on the polarity of particles included in each magnetic transition 712. The read signal that is generated corresponds to the high-frequency magnetic transitions 712 of servo spiral 710. Thus, the crossing of leading edge 711 by first read sensor 201 enables detection of servo spiral 710 by the servo system controlling the position of read/write head 127 (such as servo controller 515 in FIG. 5). Similarly, as second read sensor 202 crosses leading edge 711, second read sensor 202 generates a read signal that enables detection of servo spiral 710 by the servo system controlling the position of read/write head 127. Due to a circumferential offset 791 between first read sensor 201 and second read sensor 202, second read sensor 202 crosses leading edge 711 at a second point in time, which is a point in time later than that shown in FIG. 7.

It is noted that circumferential offset 791 is generally a different value than circumferential offset 211 (described above in conjunction with FIG. 2). In some embodiments, circumferential offset 791 varies based on skew angle 701, circumferential offset 211 (within read/write head 127), radial offset 212 (within read/write head 127), ID 301 and OD 302 of storage disk 110 (shown in FIG. 3), a length of actuator arm 124 and flexure arm 122 (shown in FIG. 1), and/or a location of a spindle center of spindle motor 114 relative to a pivot point of bearing assembly 126 (both shown in FIG. 1).

According to various embodiments, a measured time interval (such as measured time interval 603 of FIG. 6) is employed to determine an absolute radial position of read/write head 127 relative to recording surface 112 (such as absolute radial position 604 of FIG. 6). In the embodiment illustrated in FIG. 7, the measured time interval is the time interval between when first read sensor 201 crosses leading edge 711 and second read sensor 202 crosses leading edge 711. In such embodiments, the measured time interval is a function of multiple factors, such as circumferential offset 791, a circumferential velocity $V_{Circ}$ of read/write head 127 relative to recording surface 112, a radial velocity $V_{rad}$ of read/write head 127 relative to recording surface 112, circumferential offset 211, radial offset 212, and/or a spiral slope 792 of servo spiral 710. In some embodiments, conventional circuitry included in read/write channel 137A, read channel 137B, and/or servo controller 515 can determine the first point in time and the second point in time and measure the time interval therebetween. In some embodiments, the measured time interval can be used to look up a corresponding radial position entry in an absolute radial position lookup table, such as absolute radial position lookup table 600 in FIG. 6.

Using Servo Sync Mark Crossing to Determine Absolute Radial Position

Figure 8:
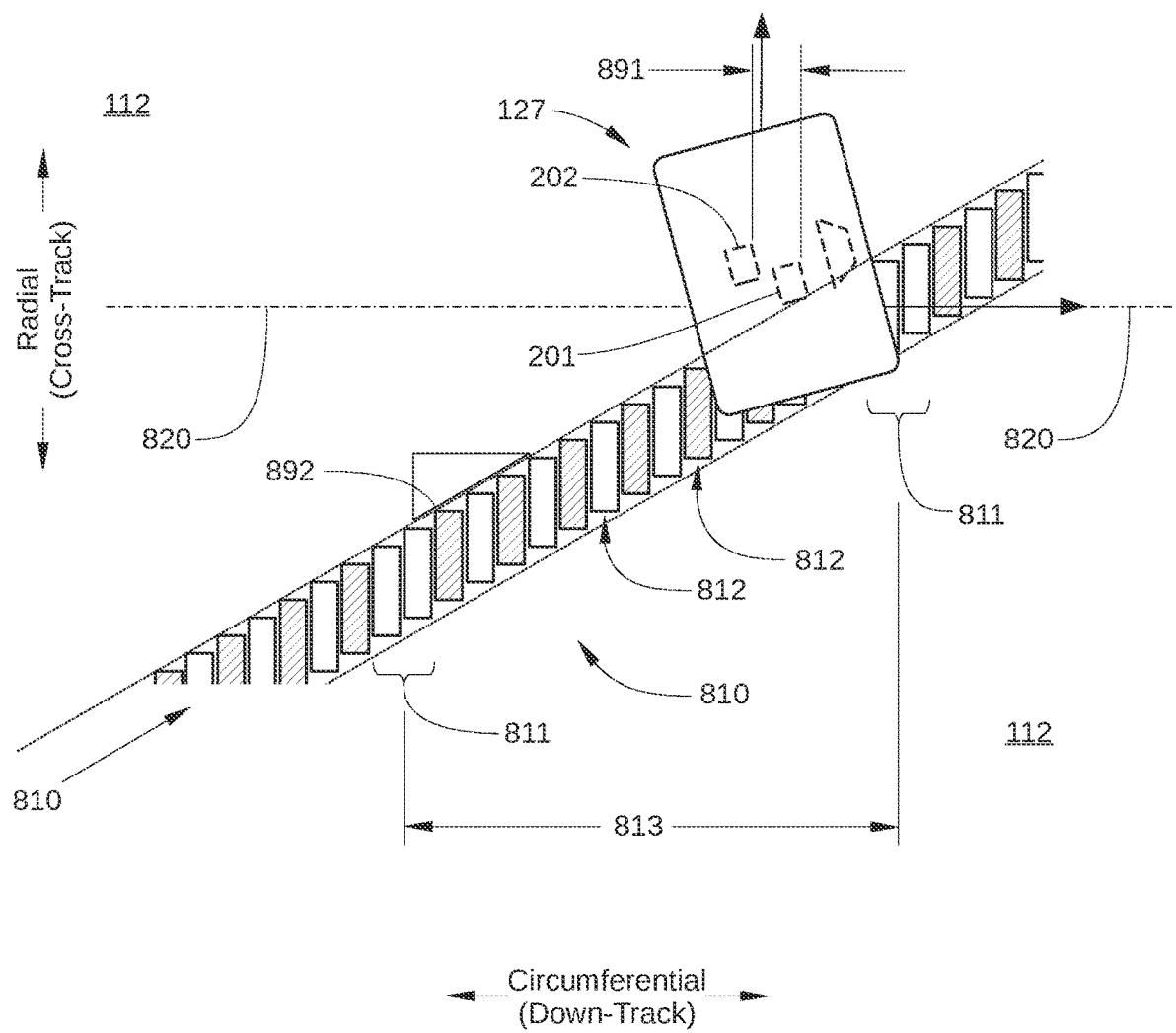
FIG. 8 schematically illustrates a time interval being measured by a read/write head based on a sync mark of a servo spiral, according to various embodiments.

FIG. 8 schematically illustrates a time interval being measured by read/write head 127 based on a sync mark 811 of a servo spiral 810, according to various embodiments. In the embodiments, an absolute radial position 820 of read/write head 127 is determined by measuring a time interval between when first read sensor 201 and second read sensor 202 cross a particular sync mark 811. In FIG. 8, read/write head 127 is schematically illustrated moving circumferentially (down-track) relative to recording surface 112 of a magnetic disk and crossing servo spiral 810. Specifically, second read sensor 202 is shown crossing a particular sync mark 811 of servo spiral 810 at a first point in time. Due to a circumferential offset 891 between first read sensor 201 and second read sensor 202, second read sensor 202 crosses sync mark 811 at a second point in time, which is a point in time later than that shown in FIG. 8.

In some embodiments, sync marks 811 of servo spiral 810 are interruptions of the high-frequency signal generated when a read sensor crosses magnetic transitions 812 of servo spiral 810, and are separated from adjacent sync marks 811 by a constant interval 813. Because sync marks 811 are separated by constant intervals 813, sync marks enable a servo write clock to maintain synchronization while product servo sectors are written to a disk surface. According to various embodiments, a single specific sync mark 811 can be employed as a circumferential reference point that enables accurate measurement of a time interval between when first read sensor 201 and second read sensor 202 cross that particular sync mark 811. Specifically, when first read sensor 201 crosses sync mark 811, first read sensor 201 is proximate the magnetic transitions 812 that are included in servo spiral 810, including the magnetic transitions that correspond to sync mark 811. Therefore, first read sensor 201 generates a signal that indicates the presence of sync mark 811, and the crossing of sync mark 811 by first read sensor 201 can be detected at a first point in time by the servo system controlling the position of read/write head 127 (such as servo controller 515 in FIG. 5). Similarly, when second read sensor 202 crosses sync mark 811, second read sensor 202 is proximate the magnetic transitions 812 that correspond to sync mark 811 and generates a signal that indicates the presence of sync mark 811. Thus, the servo system controlling the position of read/write head 127 can also detect the crossing of sync mark 811 at a second point in time by second read sensor 202.

According to various embodiments, a measured time interval for determining an absolute radial position of read/write head 127 is based on the first point in time and the second point in time. Thus, in the embodiment illustrated in FIG. 8, the measured time interval is the time interval between when first read sensor 201 crosses sync mark 811 and second read sensor 202 crosses sync mark 811. In such embodiments, the measured time interval can be used to look up a corresponding radial position entry in an absolute radial position lookup table, such as absolute radial position lookup table 600 in FIG. 6. In some embodiments, conventional circuitry included in read/write channel 137A, read channel 137B, and/or servo controller 515 can determine the first point in time and the second point in time and measure the time interval therebetween.

It is noted that in the embodiment illustrated in FIG. 8, the circumferential location that is employed to determine the measured time interval is a specific sync mark 811. In such embodiments, the measured time interval is generally not a function of a spiral slope 892. Thus, in such embodiments, variations in spiral slope 892 do not affect the accuracy of the measured time interval.

Using Servo Spiral Center Line Crossing to Determine Absolute Radial Position

Figure 9:
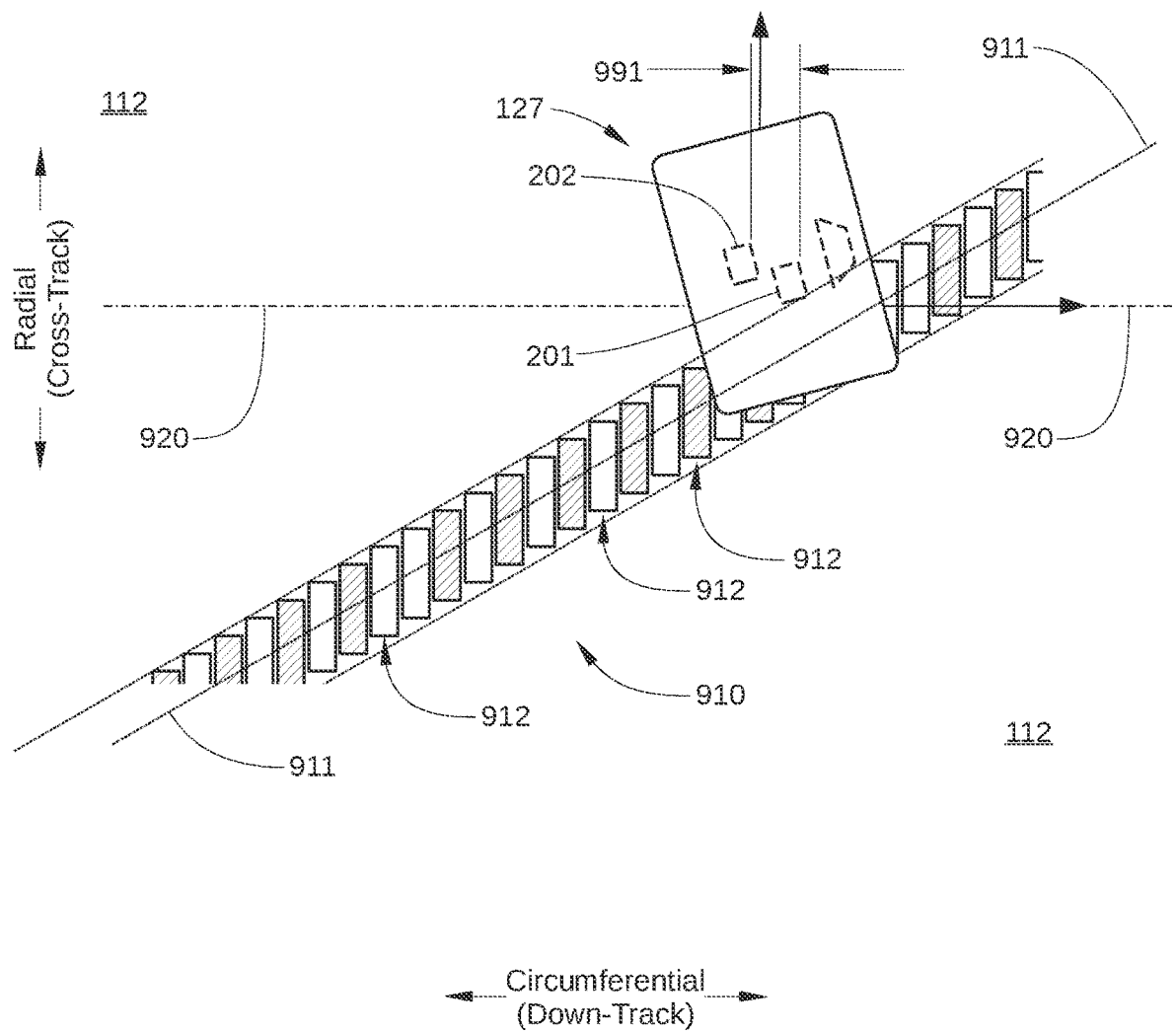
FIG. 9 schematically illustrates a time interval being measured by a read/write head based on a center line of a servo spiral, according to various embodiments.

FIG. 9 schematically illustrates a time interval being measured by read/write head 127 based on a center line of a servo spiral 910, according to various embodiments. In the embodiments, an absolute radial position 920 of read/write head 127 is determined by measuring a time interval between when first read sensor 201 and second read sensor 202 cross a center line 911 of servo spiral 910. In FIG. 9, read/write head 127 is schematically illustrated moving circumferentially (down-track) relative to recording surface 112 of a magnetic disk and crossing servo spiral 910, which includes a plurality of high-frequency magnetic transitions 912 formed on recording surface 112. First read sensor 201 is shown crossing servo spiral 910 at a beginning of a first time interval. While first read sensor 201 crosses servo spiral 910 during the first time interval, first read sensor 201 generates a first read signal that corresponds to the high-frequency magnetic transitions 912 of servo spiral 710. Due to a circumferential offset 991 between first read sensor 201 and second read sensor 202, second read sensor 202 crosses servo spiral 910 during a second time interval, which begins at a point in time later than that shown in FIG. 9. Similar to first read sensor 201, while second read sensor 202 crosses servo spiral 910 during the second time interval, second read sensor 202 generates a second read signal that corresponds to the high-frequency magnetic transitions 912 of servo spiral 710. According to various embodiments, a measured time interval for determining an absolute radial position of read/write head 127 is based on the first read signal and the second read signal. Example embodiments of the first read signal and the second read signal are described below in conjunction with FIG. 10.

Figure 10:
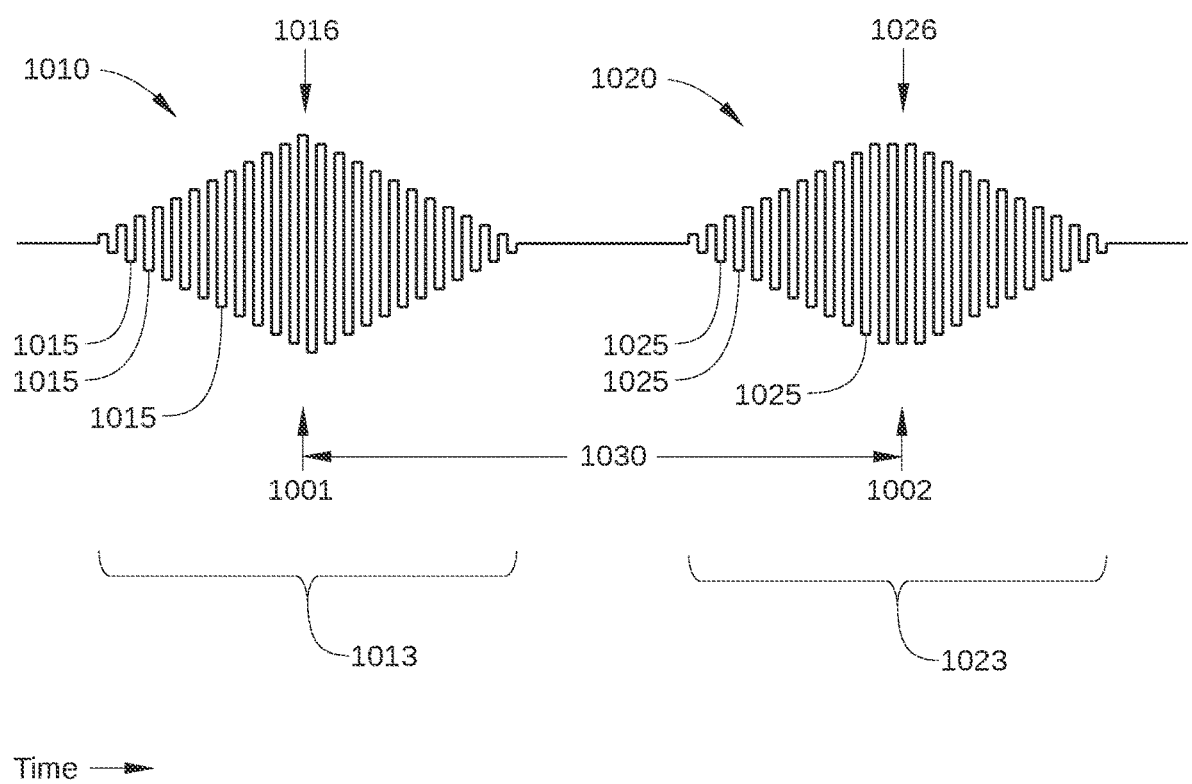
FIG. 10 schematically illustrates read signals generated by a read/write head when the read/write head crosses a servo spiral, according to various embodiments.

FIG. 10 schematically illustrates read signals generated by read/write head 127 when read/write head 127 crosses servo spiral 910, according to various embodiments. More specifically, FIG. 10 shows a first read signal 1010 generated by first read sensor 201 and a second read signal 1020 generated by second read sensor 202 when read/write head 127 crosses servo spiral 910.

First read signal 1010 includes a plurality of signals 1015 of various amplitudes that are generated as first read sensor 201 crosses servo spiral 910 (both shown in FIG. 9). Each signal 1015 corresponds to a different magnetic transition included in servo spiral 910, and as first read sensor 201 crosses servo spiral 910, signals 1015 are generated from left to right. Similarly, second read signal 1020 includes a plurality of signals 1025 of various amplitudes that are generated as second read sensor 202 (shown in FIG. 9) crosses servo spiral 910. Each signal 1025 corresponds to a different magnetic transition included in servo spiral 910, and as second read sensor 201 crosses servo spiral 910, signals 1025 are generated from left to right.

Signals 1015 of first read signal 1010 have the greatest magnitude as first read sensor 201 is disposed over center line 911 of servo spiral 910, and therefore provide spiral amplitude integration information for positioning read/write head 127, for example during a SSW process. Thus, a first point in time 1001 that corresponds to first read sensor 201 crossing the center line of servo spiral 910 can be determined based on the various amplitudes of signals 1015. For example, in some embodiments, point in time 1001 is determined via an amplitude integration process. In such embodiments, a center of mass 1016 of signals 1015 corresponds to point in time 1001. Similarly, signals 1025 of second read signal 1020 have the greatest magnitude as second read sensor 202 is disposed over center line 911 of servo spiral 910 and therefore provide spiral amplitude integration information for positioning read/write head 127. Therefore, a second point in time 1002 that corresponds to second read sensor 202 crossing center line 911 of servo spiral 910 can be determined based on the various amplitudes of signals 1025. For example, in some embodiments, point in time 1002 is determined via an amplitude integration process, and a center of mass 1026 of signals 1025 corresponds to point in time 1002.

As shown, first read signal 1010 occurs during a first time interval 1013 and second read signal 1020 occurs during a second time interval 1023, where first time interval 1013 and second time interval 1023 are offset in time by a time difference 1030. According to various embodiments, a time interval between when first read sensor 201 and second read sensor 202 cross center line 911 of servo spiral 910 corresponds to or is otherwise based on time difference 1030. In such embodiments, the measured time interval can be used to look up a corresponding radial position entry in an absolute radial position lookup table, such as absolute radial position lookup table 600 in FIG. 6. In some embodiments, conventional circuitry included in read/write channel 137A, read channel 137B, and/or servo controller 515 can determine point in time 1001 and point in time 1002 and measure time difference 1030.

Radial Position Determination of Magnetic Head Based on Servo Spiral Detection

Figure 11:
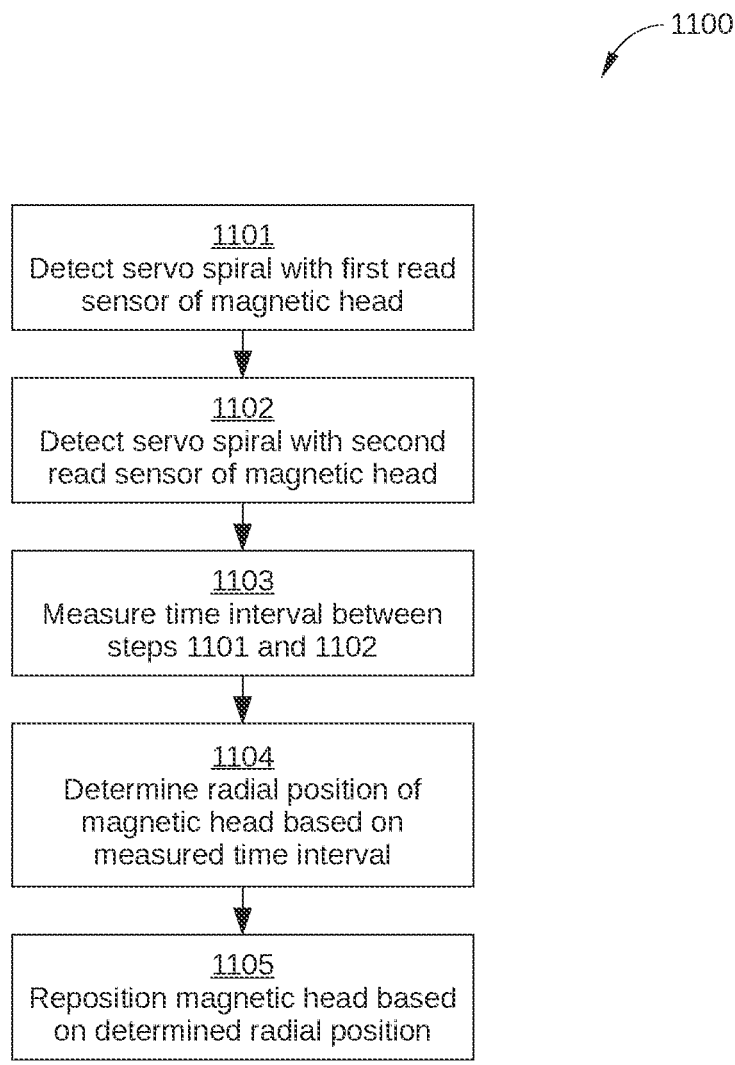
FIG. 11 sets forth a flowchart of method steps for determining an absolute radial position of a read/write head, according to various embodiments.

FIG. 11 sets forth a flowchart of method steps for determining an absolute radial position of read/write head 127, according to various embodiments. The method steps may include one or more operations, functions, or actions as illustrated by one or more of blocks 1101-1105. Although the blocks are illustrated in a sequential order, these blocks may be performed in parallel, and/or in a different order than those described herein. Also, the various blocks may be combined into fewer blocks, divided into additional blocks, and/or eliminated based upon a specific implementation. Although the method steps are described in conjunction with HDD 100 of FIGS. 1-10, persons skilled in the art will understand that the method steps may be performed with other types of systems. The control algorithms for the method steps may reside in microprocessor-based controller 133, some other controller associated with HDD 100, or a combination thereof. The control algorithms can be implemented in whole or in part as software- or firmware-implemented logic, and/or as hardware-implemented logic circuits.

In some embodiments, the method steps are performed as part of an SSW process. In such embodiments, prior to the method steps, spiral set 405 is written or otherwise formed on storage disk 110 of HDD 100, for example as coarse guide spirals. Thus, in such embodiments, a set of more precisely positioned spirals can be written in a closed-loop spiral-writing process via the method steps by demodulating signals from the more coarsely positioned spirals included in spiral set 405. Further, in such embodiments, read/write head 127 is radially positioned to write magnetic servo information, such as servo wedges for a particular data storage track 320 or a servo spiral for a new set of guide spirals. Thus, prior to the method steps, voice coil motor 128 seeks read/write head 127 to a first radial position relative to storage disk 110.

A method 1100 begins at step 1101, when a suitable controller (e.g., microprocessor-based controller 133) detects a servo spiral with a first read sensor of a magnetic head, such as read sensor 201. In some embodiments the controller detects the servo spiral based on a leading edge of the servo spiral, a center line of the servo spiral, or a specific sync mark included in the servo spiral.

In step 1102, the controller detects the servo spiral with a second read sensor of the magnetic head, such as read sensor 202. In step 1102, the controller detects the servo spiral when the second read sensor crosses the same spiral crossed by the first read sensor in step 1101. Therefore, in some embodiments the controller detects the servo spiral based on a leading edge of the servo spiral, a center line of the servo spiral, or a specific sync mark included in the servo spiral.

In step 1103, the controller measures a time interval between when the servo spiral is detected by the first read sensor and when the servo spiral is detected by the second read sensor. In step 1104, the controller determines a radial position of read/write head 127 relative to the disk based on the time interval. For example, in some embodiments, the controller determines the radial position via lookup table 600 and the time interval.

In step 1105, the controller repositions read/write head 127 based on the radial position of read/write head determined in step 1104, for example via conventional servo techniques known in the art. Thus, in some instances, in step 1105 voice coil motor 128 may seek read/write head 127 to a different radial position based on the radial position of read/write head determined in step 1104.

Alternatively, in some embodiments, in step 1105 the controller determines whether a servo write clock of HDD 100 is correctly synchronized with the servo spirals of spiral set 405. When the controller determines that correct synchronization is not maintained, for example due to missing a servo spiral, the controller uses the radial position determined in step 1104 to control the radial position of read/write head 127. By contrast, when the controller determines that correct synchronization is maintained, the controller controls the radial position of read/write head 127 normally, for example using timing and position information from the spirals of spiral set 405 via conventional servo control approaches. In some embodiments, the controller determines that correct synchronization is not maintained based on the radial position determined in step 1104.

While the foregoing is directed to embodiments of the present invention, other and further embodiments of the invention may be devised without departing from the basic scope thereof, and the scope thereof is determined by the claims that follow.

We claim:

1. A method of determining radial position of a magnetic head that includes a first read sensor and a second read sensor, the method comprising:
   with the first read sensor, detecting a servo spiral formed on a disk;
   with the second read sensor, detecting the servo spiral;
   measuring a time interval between when the servo spiral is detected by the first read sensor and when the servo spiral is detected by the second read sensor; and
   based on the time interval, determining a radial position of the magnetic head relative to the disk.

2. The method of claim 1, wherein determining the radial position of the magnetic head relative to the disk comprises determining the radial position based on a set of pre-computed radial position values.

3. The method of claim 2, wherein each pre-computed radial value in the set of pre-computed position radial values corresponds to a different time interval value.

4. The method of claim 2, wherein each pre-computed radial value in the set of pre-computed radial position values is based on one or more of a displacement between the first read sensor and the second read sensor within the magnetic head, a length of an actuator arm on which the magnetic head is mounted, a skew angle of the magnetic head relative to the disk, an inner diameter of the disk, an outer diameter of the disk, a slope of the servo spiral, or a location of a spindle center of a spindle motor for rotating the disk relative to a pivot point of bearing assembly for actuating the actuator arm.

5. The method of claim 4, wherein the displacement between the first read sensor and the second read sensor comprises at least one of a radial offset within the magnetic head and a circumferential offset within the magnetic head.

6. The method of claim 2, wherein determining the radial position based on the set of pre-computed position radial values comprises selecting a pre-computed radial value from the set of pre-computed position radial values that corresponds to the time interval.

7. The method of claim 2, wherein determining the radial position based on the set of pre-computed position radial values comprises interpolating between two values in the set of pre-computed position radial values.

8. The method of claim 1, wherein detecting the servo spiral with the first read sensor comprises one of determining a first point in time at which the first read sensor crosses a leading edge of the servo spiral, determining a second point in time at which the first reader head crosses a center line of the servo spiral, and determining a third point in time at which the first read sensor crosses a first sync mark included in the servo spiral.

9. The method of claim 8, further comprising determining the center line of the servo spiral based on a plurality of signals generated by the first read sensor crossing the servo spiral.

10. The method of claim 8, wherein detecting the servo spiral with the second read sensor comprises one of determining a fourth point in time at which the second read sensor crosses the leading edge of the servo spiral, determining a fifth point in time at which the second reader head crosses the center of mass of the servo spiral, and determining a sixth point in time at which the second read sensor crosses the first sync mark included in the servo spiral.

11. The method of claim 10, wherein the time interval comprises one of a time difference between the first point in time and the fourth point in time, a time difference between the second point in time and the fifth point in time, or a time difference between the third point in time and the sixth point in time.

12. The method of claim 8, further comprising determining the center line of the servo spiral based on a first center of mass of first signals generated by the first read sensor crossing the servo spiral.

13. The method of claim 1, further comprising, based on the radial position of the magnetic head relative to the disk, controlling a radial velocity of the magnetic head relative to the disk.

14. A disk drive, comprising:
   a magnetic head having first and second read sensors;
   a disk medium with a first surface on which at least one servo spiral is formed; and
   a controller configured to perform the steps of:
      with the first read sensor, detecting a servo spiral formed on a disk;
      with the second read sensor, detecting the servo spiral;
      measuring a time interval between when the servo spiral is detected by the first read sensor and when the servo spiral is detected by the second read sensor; and
      based on the time interval, determining a radial position of the magnetic head relative to the disk.

15. The disk drive of claim 14, wherein determining the radial position of the magnetic head relative to the disk comprises determining the radial position based on a set of pre-computed radial position values.

16. The disk drive of claim 14, wherein detecting the servo spiral with the first read sensor comprises one of determining a first point in time at which the first read sensor crosses a leading edge of the servo spiral, determining a second point in time at which the first reader head crosses a center line of the servo spiral, and determining a third point in time at which the first read sensor crosses a first sync mark included in the servo spiral.

17. The disk drive of claim 16, wherein the controller is further configured to perform the step of determining the center line of the servo spiral based on a plurality of signals generated by the first read sensor crossing the servo spiral.

18. The disk drive of claim 16, wherein detecting the servo spiral with the second read sensor comprises one of determining a fourth point in time at which the second read sensor crosses the leading edge of the servo spiral, determining a fifth point in time at which the second reader head crosses the center of mass of the servo spiral, and determining a sixth point in time at which the second read sensor crosses the first sync mark included in the servo spiral.

19. The disk drive of claim 18, wherein the time interval comprises one of a time difference between the first point in time and the fourth point in time, a time difference between the second point in time and the fifth point in time, or a time difference between the third point in time and the sixth point in time.

20. The disk drive of claim 16, wherein the controller is further configured to perform the step of determining the center line of the servo spiral based on a first center of mass of first signals generated by the first read sensor crossing the servo spiral.

* * * * *